(12) United States Patent
Liu et al.

(10) Patent No.: US 10,922,192 B2
(45) Date of Patent: Feb. 16, 2021

(54) METHOD, DEVICE AND COMPUTER PROGRAM PRODUCT FOR DATA BACKUP INCLUDING DETERMINING A HARDWARE CONFIGURATION ALLOCATED TO A PROXY VIRTUAL MACHINE BASED ON A WORKLOAD OF A BACKUP JOB

(71) Applicant: EMC IP Holding Company LLC, Hopkinton, MA (US)

(72) Inventors: Jie Liu, Chengdu (CN); Ningping Gou, Chengdu (CN); Ying Li, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 16/251,416

(22) Filed: Jan. 18, 2019

(65) Prior Publication Data

US 2019/0220369 A1    Jul. 18, 2019

(30) Foreign Application Priority Data

Jan. 18, 2018 (CN) .......................... 201810051527.5

(51) Int. Cl.
*G06F 11/14* (2006.01)
*G06F 11/34* (2006.01)
(Continued)

(52) U.S. Cl.
CPC ...... *G06F 11/1464* (2013.01); *G06F 9/45558* (2013.01); *G06F 9/5077* (2013.01);
(Continued)

(58) Field of Classification Search
CPC ............. G06F 11/1464; G06F 11/1451; G06F 11/1461; G06F 11/1469; G06F 11/3419;
(Continued)

(56) References Cited

U.S. PATENT DOCUMENTS

9,639,428 B1* 5/2017 Boda .................... G06F 9/45533
9,772,909 B1* 9/2017 Xing .................... G06F 11/1469
(Continued)

*Primary Examiner* — Tuan V Thai
(74) *Attorney, Agent, or Firm* — Chamberlain, Hrdlicka, White, Williams & Aughtry (57) ABSTRACT

Methods, devices and computer program products for data backup are disclosed. The method includes receiving, from a destination node, a workload of a backup job, the workload being determined by the destination node in response to a request for the backup job from a source node, and determining a hardware configuration to be allocated to a proxy virtual machine deployed in a plurality of virtual machines on the source node based on the workload, the proxy virtual machine including a backup application for performing data backup for the plurality of virtual machines. The method further includes transmitting an indication of the hardware configuration to the proxy virtual machine to enable the backup application to perform the backup job using the hardware configuration. The workload may comprise a data change rate of the source node and a backup rate of the proxy virtual machine that are predicted based on history data stored at the destination node. The history data may include backup times required by a unit workload for previous backups. An indication of an allowed number of concurrent backups for a backup job may be transmitted to the proxy virtual machine.

18 Claims, 7 Drawing Sheets

(51) Int. Cl.
*G06F 9/50* (2006.01)
*G06F 9/455* (2018.01)
(52) U.S. Cl.
CPC ...... *G06F 11/1451* (2013.01); *G06F 11/1461* (2013.01); *G06F 11/1469* (2013.01); *G06F 11/3419* (2013.01); *G06F 11/3452* (2013.01); *G06F 2009/45575* (2013.01); *G06F 2201/815* (2013.01)
(58) Field of Classification Search
CPC ............ G06F 11/3452; G06F 9/45558; G06F 9/5077; G06F 2009/45575; G06F 2201/815; G06F 12/00
See application file for complete search history.

(56) References Cited

U.S. PATENT DOCUMENTS

| | | | |
|---|---|---|---|
| 10,579,283 B1 * | 3/2020 | Chopra | G06F 3/0619 |
| 2009/0172322 A1 * | 7/2009 | Gilpin | G06F 11/1456 711/162 |
| 2013/0055239 A1 * | 2/2013 | Anderson | G06F 9/455 718/1 |
| 2016/0371153 A1 * | 12/2016 | Dornemann | G06F 11/1464 |

* cited by examiner

-- PRIOR ART --

METHOD, DEVICE AND COMPUTER PROGRAM PRODUCT FOR DATA BACKUP INCLUDING DETERMINING A HARDWARE CONFIGURATION ALLOCATED TO A PROXY VIRTUAL MACHINE BASED ON A WORKLOAD OF A BACKUP JOB

FIELD

The present disclosure generally relates to the field of data backup, and more specifically, to a method, device and computer program product for data backup.

BACKGROUND

A storage service provider generally performs data backup based on user's demand through a proxy virtual machine deployed at a source node. The proxy virtual machine substantially belongs to a virtual machine on the source node and is located at the user side, and it is packaged with an application for data backup. When it needs to perform data backup, an administrator may execute the application for data backup by deploying a plurality of proxy virtual machines so as to back up data in each virtual machine in the source node to the destination node. It should be noted that the hardware configuration allocated to each proxy virtual machine is default, generally four central processing units (CPUs) and 4 gigabytes (GB) memory.

As the workload of each data backup is different, the administrator needs to adjust the number of proxy virtual machines manually. For example, if the workload of this data backup is obviously higher than the previous one, in the case that one is not expected to lengthen the backup time significantly, the administrator needs to deploy more virtual machines. However, if the workload of this data backup is obviously lower than the previous one, under the condition that it is not desirable to waste user's hardware resources, the administrator needs to reduce the number of proxy virtual machines.

SUMMARY

Embodiments of the present disclosure are directed to providing a method, device and a corresponding computer program product for data backup.

In a first embodiment of the present invention, there is provided a method of data backup. The method includes receiving, at a management node and from a destination node, a workload of a backup job, wherein the workload is determined by the destination node in response to a request for the backup job from a source node. The method further includes: determining, by the managing node and based on the workload, a hardware configuration to be allocated to a proxy virtual machine arranged in a plurality of virtual machines on the source node, the proxy virtual machine including a backup application for performing data backup for the plurality of virtual machines. The method further includes transmitting, by the managing node, an indication of the hardware configuration to the proxy virtual machine of the source node to enable the backup application to perform the backup job by using the hardware configuration.

In some embodiments, the workload may include a data change rate of the source node and a backup rate of the proxy virtual machine that are predicted based on history data stored at the destination node, where the history data include a plurality of data change rates and a plurality of backup times corresponding to a plurality of backup jobs that have occurred.

In some embodiments, the data change rate of the source node is predicted based on the plurality of data change rates, and the backup rate of the proxy virtual machine is predicted based on the plurality of data change rates and the plurality of backup times.

In some embodiments, the method further includes configuring an allowed number of concurrent backups for the backup job; and transmitting an indication of the allowed number of concurrent backups for a backup job to the proxy virtual machine of the source node to enable the backup application to perform the backup job based on the allowed number of concurrent backups.

In some embodiments, configuring the allowed number of concurrent backups for the backup job may include: obtaining, from the history data, a first backup time required by a unit workload of a previous backup; obtaining, from the history data, a second backup time required by a unit workload of a backup prior to the previous backup; and when the first backup time is shorter than the second backup time, increasing the allowed number of concurrent backups.

In some embodiments, the method further includes suspending the proxy virtual machine in response to failing to receive the workload from the destination node associated with the request within a predetermined period of time.

In some embodiments, the method further includes obtaining an actual data change rate of the source node via the proxy virtual machine; and when a difference between the data change rate and the actual data change rate being greater than a predetermined threshold, reporting to a managing node that the difference is greater than the predetermined threshold.

In a second embodiment of the present invention, there is provided a method of data backup. The method includes: transmitting, by a source node, a request for backup job to a destination node, wherein a proxy virtual machine arranged in a plurality of virtual machines on the source node includes a backup application for performing data backup for the plurality of virtual machines. The method further includes: receiving an indication of hardware configuration from a managing node, the hardware configuration being allocated to the proxy virtual machine by the managing node based on a workload of the backup job, the workload being determined by the destination node in response to the request. The method further includes: performing the backup job via the backup application based on the hardware configuration.

In a third embodiment of the present invention, there is provided an electronic device. The device includes at least one processing unit and at least one memory coupled to the at least one processing unit and storing machine executable instructions. The instructions, when executed by the at least one processing unit, cause the at least one processing unit to perform a method, including: receiving, from a destination node, a workload of a backup job, wherein the workload is determined by the destination node in response to a request for the backup job from a source node; determining, based on the workload, a hardware configuration to be allocated to a proxy virtual machine arranged in a plurality of virtual machines on the source node, the proxy virtual machine including a backup application for performing data backup for the plurality of virtual machines; and transmitting an indication of the hardware configuration to the proxy virtual machine of the source node to enable the backup application to perform the backup job using the hardware configuration.

In a fourth embodiment of the present invention, there is provided an electronic device. The device includes at least one processing unit and at least one memory coupled to the at least one processing unit and storing machine executable instructions. The instructions, when executed by the at least one processing unit, cause the at least one processing unit to perform a method, including: transmitting, by a source node, a request for a backup job to a destination node, wherein a proxy virtual machine in a plurality of virtual machines on the source node includes a backup application for performing data backup for the plurality of virtual machines; receiving an indication of hardware configuration from a managing node, the hardware configuration being allocated to the proxy virtual machine by the managing node based on a workload of the backup job, the workload being determined by the destination node in response to the request; and performing the backup job via the backup application based on the hardware configuration.

In a fifth embodiment of the present invention, there is provided a computer program product tangibly stored on a non-transitory computer-readable medium and comprising machine-executable instructions which, when executed, cause a machine to perform steps of the method described according to the first aspect or second aspect of the present disclosure.

This Summary is provided to introduce a selection of concepts that are further described below in the Detailed Description in a simplified form. This Summary is not intended to identify key features or essential features of the present disclosure, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In example embodiments of the present disclosure, the same reference symbols usually refer to the same components.

DETAILED DESCRIPTION OF EMBODIMENTS

Preferred embodiments of the present disclosure will be described in greater detail with reference to the drawings. Although the drawings present the preferred embodiments of the present disclosure, it should be understood that the present disclosure can be implemented in various ways and should not be limited by the embodiments disclosed herein. Rather, those embodiments are provided for a thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may be used to distinguish between objects, and are not meant to imply or create any particular ordering of the objects. Other explicit and implicit definitions might further be included in the following description.

A traditional network storage device includes a source node, a managing node and a destination node. In some embodiments, the source node may include a server at the user side (such as ESX server) and a corresponding storage array (not shown). The managing node may include a server at the managing side (such as VCENTER server). The destination node may include a server (such as AVAMAR server) at the service provider side. The source node, managing node and destination node may be interconnected via a transmission control protocol/Internet protocol (TCP/IP) interface or other interfaces.

Figure 1:
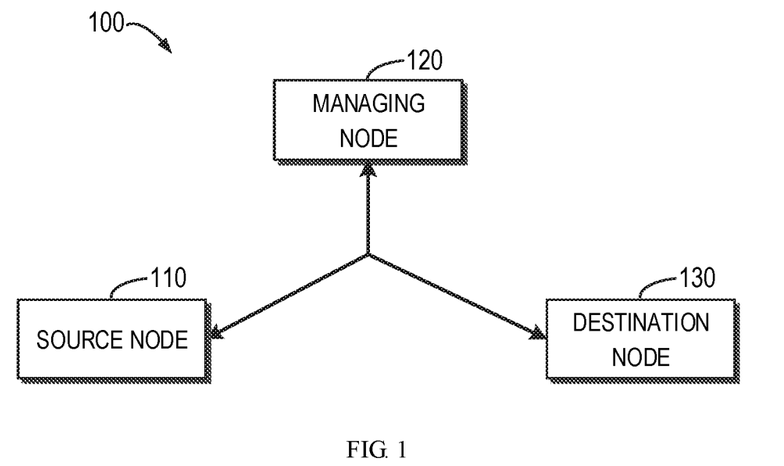
FIG. 1 illustrates a schematic diagram of a data backup system in accordance with embodiments of the present disclosure.

FIG. 1 illustrates a schematic diagram of a data backup system 100 in accordance with embodiments of the present disclosure. As shown in FIG. 1, a backup system 100 includes a source node 110, a managing node 120 and a destination node 130 which may be interconnected via a TCP/IP interface or other interfaces.

A plurality of virtual machines may be configured at the source node for daily use by the user. When the user needs to back up data at the source node to the destination node, the administrator would generally deploy a proxy virtual machine by the managing node in the plurality of virtual machines at the source node. The proxy virtual machine is packaged with an application for data backup.

Figure 2A:
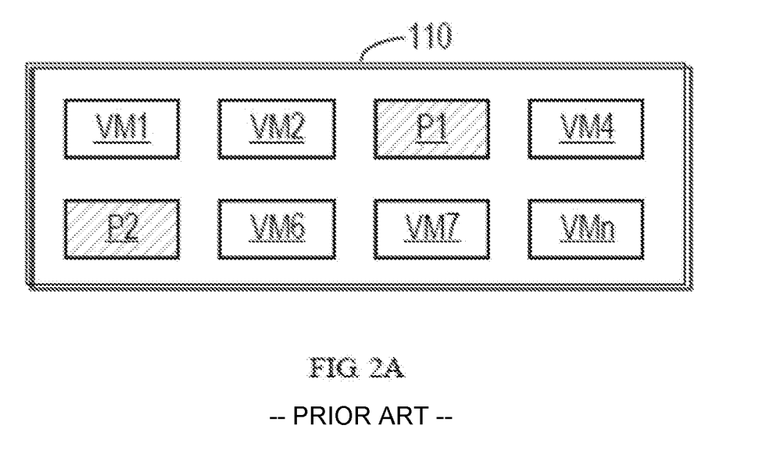
FIG. 2A illustrates a schematic diagram of a source node in accordance with a traditional data backup system.

FIG. 2A illustrates a schematic diagram of a source node in accordance with a traditional data backup system. As shown in FIG. 2A, the source node 110 is configured with multiple virtual machines VM1, VM2, P1, VM4, P2, VM6, VM7 and VMn. The virtual machines P1 and P2 are proxy virtual machines for data backup deployed by the administrator. The hardware configuration allocated to each proxy virtual machine is by default, generally four CPUs and 4 GB memory. Alternatively, the administrator may also deploy other virtual machines, such as VM1, VM2, etc., as proxy virtual machines. As an example, in FIG. 2A, the proxy virtual machine P1 may execute concurrent backup jobs of virtual machines VM1, VM2 and VM4, and the proxy virtual machine P2 may execute concurrent backup jobs of virtual machines VM6, VM7 and VMn.

When the workload of data backup is reduced, for instance, when only virtual machines VM1, VM2, VM6 and VM7 need to perform data backup, it would waste user hardware resources to deploy two proxy virtual machines P1 and P2 at the same time. Presently, in this case, the administrator may switch off one of the proxy virtual machines P1 and P2 via the managing node 120. However, the real situation is that the source node 110 may contain hundreds of virtual machines while the number of proxy virtual machines deployed for data backup may also be as many as several or a dozen. According to user's needs, each data backup operation may need to be completed within the same backup window time, which requires adjustment of the number of proxy virtual machines based on the workload. However, since the workload of each data backup is invisible to the administrator, the administrator does not know how many proxies should be increased/decreased to meet the updated workload. Therefore, the administrator needs to try different numbers of proxy virtual machines for better data backup efficiency.

Figure 2B:
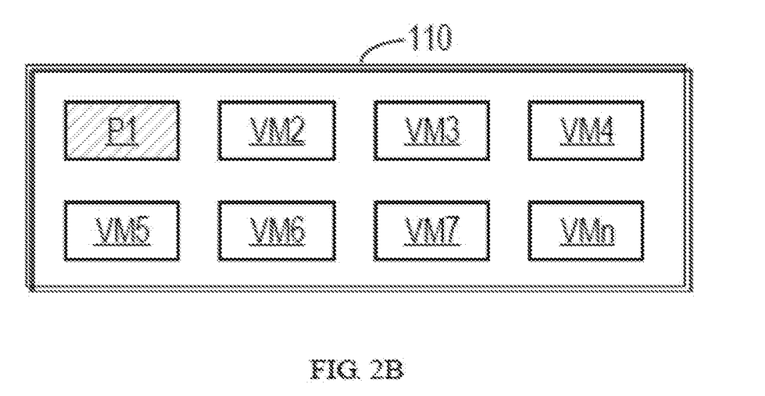
FIG. 2B illustrates a schematic diagram of a source node in a data backup system in accordance with embodiments of the present disclosure.

To solve the above and other potential problems and defects at least in part, embodiments of the present disclosure provide a technical solution for data backup. FIG. 2B illustrates embodiments of the invention of the present disclosure, namely, only one proxy virtual machine P1 is deployed corresponding to the disk array of the source node 110. Different from the traditional allocation of default hardware resources, the hardware resources allocated to the proxy virtual machine P1 may be adjusted based on the workload of data backup.

FIG. 2B illustrates a schematic diagram of a source node 110 in accordance with embodiments of the present disclosure. As shown in FIG. 2B, the source node 110 is configured with a plurality of virtual machines P1, VM2, VM3, VM4, VM5, VM6, VM7 and VMn. The virtual machine P1 is the proxy virtual machine deployed by the administrator for data backup. In some embodiments, as depicted above with reference to FIG. 2A, the proxy virtual machine may execute concurrent backup jobs of as many as four virtual machines. More preferably, the proxy virtual machine may execute the concurrent backup jobs of as many as eight virtual machines. Alternatively, with the improvement of performance, the virtual machine may execute the concurrent backup jobs of as many as a particular number (for instance, 16 or more) of virtual machines. The hardware configuration allocated to the proxy virtual machine P1 may be adjusted based on the workload of data backup. As an example, when this data backup only needs to back up VM2 and VM3 in the source node 110, it is possible to allocate a hardware configuration of 2 CPUs and 2 GB memory (smaller than the traditional default configuration) to the proxy virtual machine P1. When this data backup needs to back up VM2, VM3, VM4, VM5, VM6, VM7 and VMn in the source node 110, it is possible to allocate a hardware configuration of 6 CPUs and 8 GB memory (smaller than twice the traditional default configuration) to the proxy virtual machine P1. The allocation of a hardware configuration may be completed by the managing node 120 automatically without complicated manual operation by the administrator.

The workload may include a data change rate of the source node 110 and a backup rate of the proxy virtual machine P1. It is to be understood that the source node 110 and the proxy virtual machine P1 are both located at the user side and invisible to the managing node 120. However, the destination node 130 stores history data of each past time of backing up data of the source node 110 to the destination node 130 and this history data contains the exact data change rate and backup time for each past backup job. With the data change rate and backup time for each backup job, it is possible to calculate the backup rate of proxy virtual machine P1 of each past backup job. With this history data, the data change rate of the source node 110 and the backup rate of the proxy virtual machine P1 of this data backup may be predicted. As an example, the trend thereafter may be predicted based on the time sequence of history data. Alternatively, or additionally, a Triple Order Exponential Smoothing (Holt-Winters) algorithm may be used to predict the time sequence. When the data change rate of the source node 110 and the backup rate of the proxy virtual machine P1 of a data backup are obtained as predicted based on history data, the destination node 130 transmits this data (the data change rate and the backup rate) to the managing node 120. The managing node 120 may allocate hardware resources to the proxy virtual machine P1 based on data obtained through forecasting.

Figure 3:
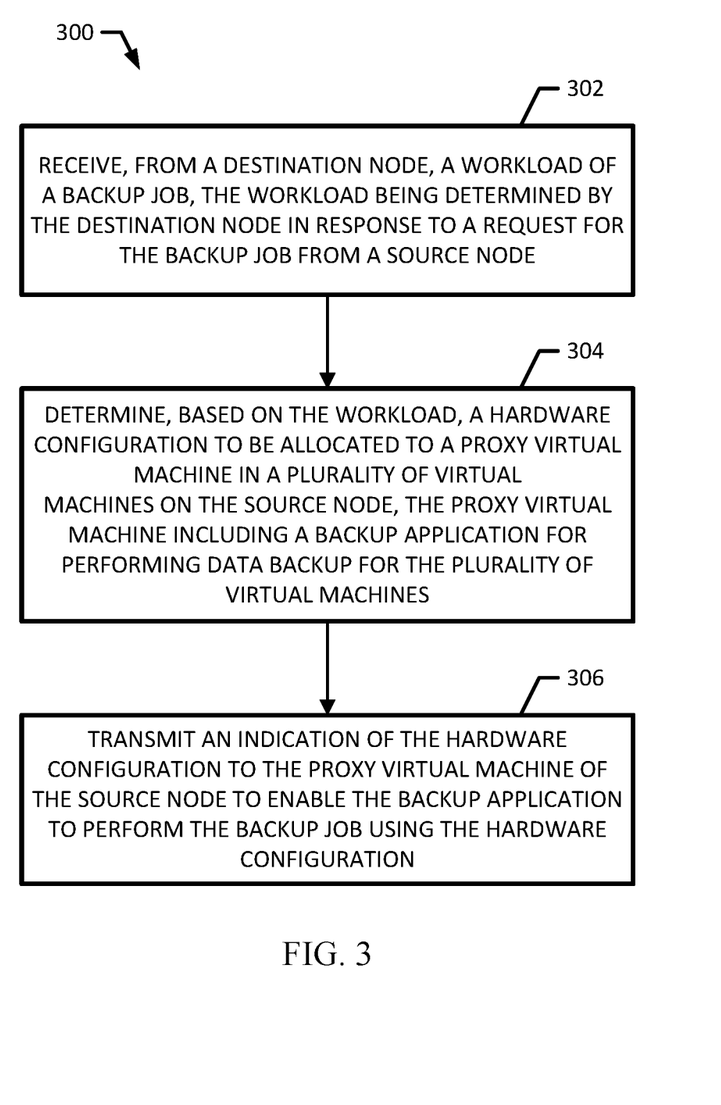
FIG. 3 illustrates a flowchart of a process or method for data backup in accordance with embodiments of the present disclosure.

FIG. 3 illustrates a flowchart of a process or method 300 for data backup in accordance with embodiments of the present disclosure. In some embodiments, the method 300 may be implemented in the device shown in FIG. 7. As an example, the method 300 may be implemented in the managing node 120 shown in FIG. 1. Now, referring to FIGS. 1 and 2B, the process or method 300 for data backup according to embodiments of the present disclosure is depicted. It is to be understood that for the ease of understanding, the specific data mentioned below are illustrative, rather than to limit the scope of protection of the present disclosure.

At 302, the workload of the backup job is received from the destination node 130. The workload is determined by the destination node 130 in response to the request for the backup job from the source node 110. In some embodiments, the workload may include the data change rate of the source node 110 and the backup rate of the proxy virtual machine P1. As stated above, the data change rate of the source node 110 and the backup rate of the proxy virtual machine P1 are both obtained through forecasting based on history data stored at the destination node 130. As an example, the history data may include a plurality of data change rates and a plurality of backup times corresponding to each past backup job. Additionally or alternatively, the data change rate of a data backup may be predicted based on each past data change rate in the history data, and the backup rate of a data backup may also be predicted based on each past data change rate and the corresponding backup time in the history data. By forecasting the workload of this data backup at the destination node 130, the whole backup system (including destination node 130 and the managing node 120) may be partly visible to the workload of the current data backup so as to be ready for allocating hardware configuration to the proxy virtual machine P1 based on the workload.

At 304, the hardware configuration to be allocated to a proxy virtual machine P1 among a plurality of virtual machines deployed on the source node 110 is determined based on the workload. The proxy virtual machine P1 may include a backup application for executing data backup for a plurality of virtual machines VM2 . . . VMn. As an example, when it is predicted that it needs to perform data backup for 24 virtual machines in the source node 110, 8 CPUs and 6 GB memory may be allocated to the proxy virtual machine P1. Alternatively, the hardware configuration is allocated to the proxy virtual machine P1 based on the backup time desired by the administrator, besides the workload mentioned above. As an example, the proxy virtual machine P1 is allocated with 8 CPUs and 6 GB memory to achieve concurrent backup jobs for 24 virtual machines in the source node 110. In addition, the above hardware configuration may be the specific configuration of CPU and memory, or other hardware configuration for data backup. By determining the hardware configuration required by the proxy virtual machine based on workload, the hardware resource at the user side may be utilized more precisely.

At 306, an indication of a hardware configuration is transmitted to the proxy virtual machine P1 of the source node 110 so as to enable the backup application to perform the backup job with or by using the hardware configuration. As an example, it is possible to transmit the indication of the predetermined hardware configuration (such as six CPUs and 8 GB memory) to the proxy virtual machine P1 which may schedule the backup application using the allocated hardware resource so as to perform a backup operation to the plurality of virtual machines at the source node 110.

In some embodiments, the proxy virtual machine P1 may also be suspended in response to failing to receive the workload associated with the request from the destination node 130 within a predetermined period of time. As an example, when the destination node 130 does not receive a data backup request from the source node 110 within a predetermined period of time, for instance, 5 minutes, the virtual machine P1 will be suspended so as to enter a dormant mode. Alternatively, it is possible to suspend the proxy virtual machine P1 to the lowest hardware configuration, for instance, 1 CPU and 1 GB memory. In response to a waking-up signal, the proxy virtual machine P1 may quit or exit the dormant state timely to perform data backup operation. Additionally, when the destination node 130 fails to detect a backup request within a predetermined period of time, for instance, five minutes, the virtual machine P1 is suspended to enter the dormant mode. By suspending the proxy virtual machine P1 after determining that there are no data backup jobs, it is possible to save hardware resources for the user within a considerable period of time so as to improve the efficiency of data backup as a whole.

As stated above, determining the hardware configuration of the proxy virtual machine P1 for data backup may allocate hardware resources at the user side precisely and reasonably. To make the result of resource allocation more reasonable, it is also possible to set the allowed number of concurrent backups of the current backup job at the start of the backup job.

Figure 4:
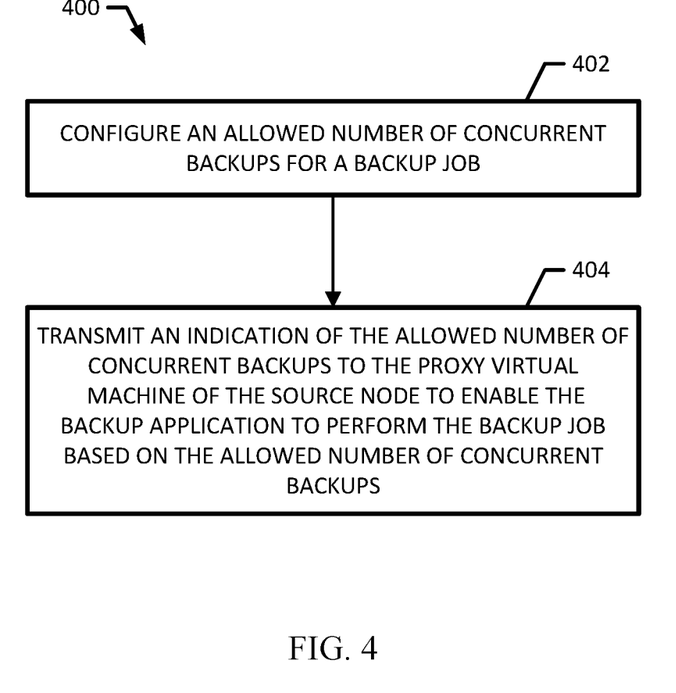
FIG. 4 illustrates a flowchart of another process or method for data backup in accordance with embodiments of the present disclosure.

As each storage system has an input/output (I/O) limit, the increase of the number of concurrent backup jobs of the proxy virtual machine P1 will not improve the backup efficiency after a certain number has been reached, or may even impact negatively on the backup efficiency. As shown in FIG. 4, it is possible to set the allowed number of concurrent backups for a backup job for the proxy virtual machine P1 through a method or process 400.

Figure 5:
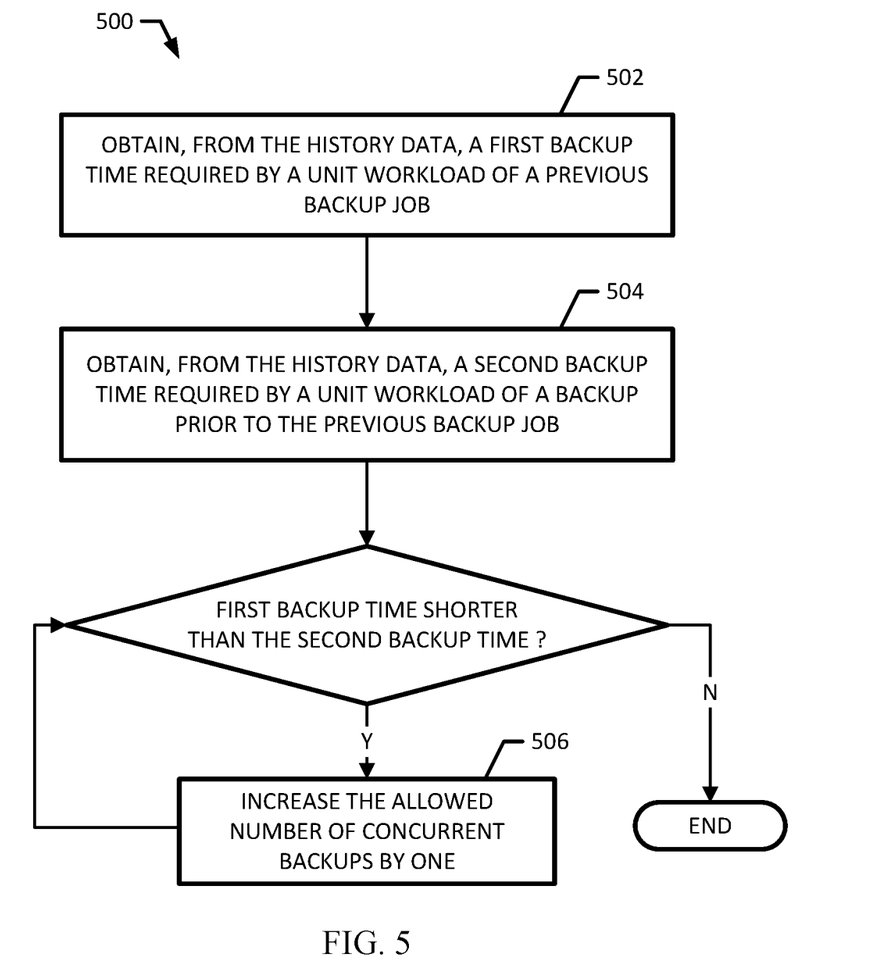
FIG. 5 illustrates a flowchart of a process or method for configuring an allowed number of concurrent backups for a backup job in accordance with embodiments of the present disclosure.

At 402, the allowed number of concurrent backups for the backup job is set. As an example, it is possible to predict the allowed number of concurrent backups for a backup job based on history data at the destination node 130. FIG. 5 illustrates a flowchart of another process or method 500 for configuring an allowed number of concurrent backups for a backup job in accordance with embodiments of the present disclosure. At 502, a first backup time required by a unit workload of the previous backup is obtained from history data. As an example, time T1 required for completing a 1 terabyte (TB) workload of the previous backup (such as the backup on Jan. 12, 2018) may be calculated based on history data. At 504, a second backup time required by a unit workload of a backup prior to the previous backup may be obtained from history data. As an example, time T2 required for completing a 1 TB workload for a backup (for example, backup on Jan. 11, 2018) prior to the previous backup may be calculated based on history data. Next, a decision is made as to whether backup time T1 is shorter than backup time T2. If the backup time T1 is shorter than the backup time T2, the allowed number of concurrent backups is increased by 1 at 506. If the backup time T1 is not shorter than the backup time T2, the adjustment of the allowed number of concurrent backups is terminated. That is, when it is found that the backup time T1 on Jan. 12, 2018 is shorter than the backup time T2 on Jan. 11, 2018, it may be determined preliminarily that the number of concurrent backup jobs of the proxy virtual machine P1 has not reached the allowed number of concurrent backups (namely, the maximum concurrent number). Thus, the system may add an allowed number of concurrent backups automatically so as to further optimize the efficiency of a data backup.

Alternatively, or additionally, it is also possible to use a Triple Order Exponential Smoothing (Holt-Winters) algorithm to model parameters of each past time in history data (for example, the time required for backing up the unit workload detected at the destination node 130 or a backup rate detected at the destination node 130), thereby determining the change trend of the allowed number of concurrent backups. When the proxy virtual machine P1 is configured with a more precise allowed number of concurrent backups, the proxy virtual machine P1 may process a plurality of concurrent backup jobs in batch more orderly so as to maximize the backup efficiency.

Returning to refer to FIG. 4, at 404, the indication of allowed number of concurrent backups is transmitted to the proxy virtual machine P1 of the source node 110 so as to enable the backup application to perform backup job based on the allowed number of concurrent backups. When the allowed number of concurrent backups is a predetermined number (such as 16), the proxy virtual machine P1 of the source node 110 may perform at most 16 backup jobs. If the backup jobs to be performed are more than 16, the proxy virtual machine P1 performs these backup jobs for multiple times based on the allowed number of concurrent backups of 16 backup jobs. Compared with performing all the backup jobs serially and executing all the backup jobs in parallel, it may improve backup efficiency significantly to perform backup jobs in batch based on the allowed number of concurrent backups.

Figure 6:
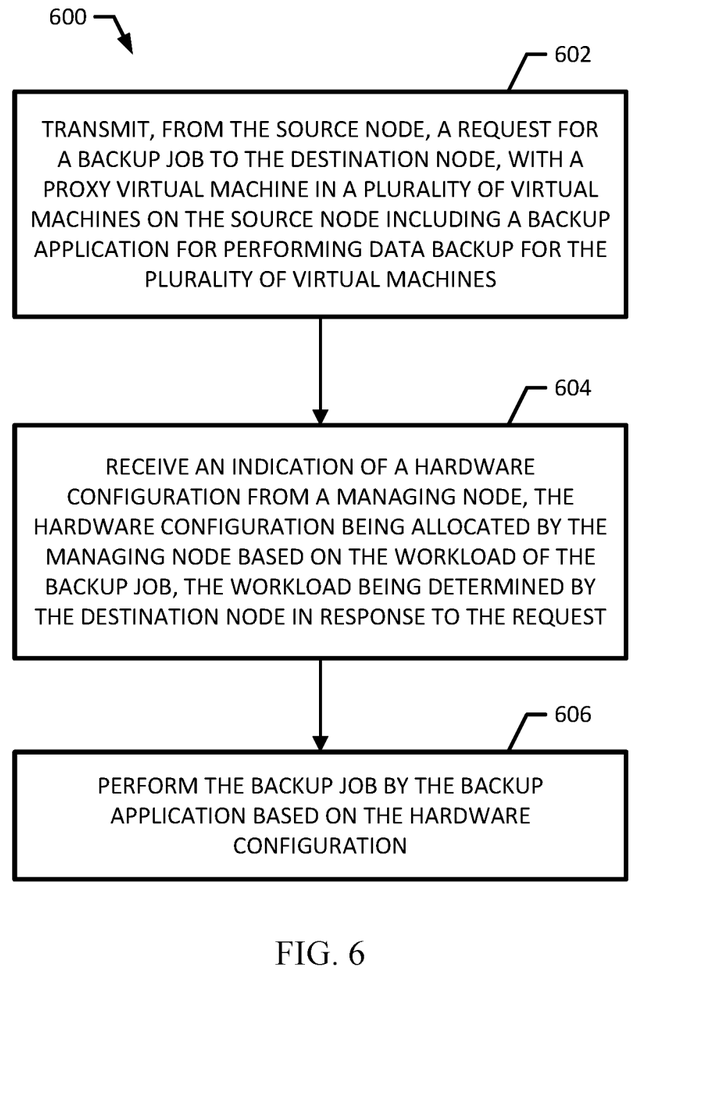
FIG. 6 illustrates a flowchart of yet another process or method for data backup in accordance with embodiments of the present disclosure.

FIG. 6 illustrates a flowchart of a yet another process or method 600 for data backup in accordance with embodiments of the present disclosure. In some embodiments, the method 600 may be implemented in the device shown in FIG. 7. As an example, the method 600 may be implemented at the source node 110 shown in FIG. 1. Now, with reference to FIGS. 1 and 2B, the process or method 600 shown in FIG. 6 for data backup according to embodiments of the present disclosure is described. It is to be understood that for ease of understanding, the specific data mentioned below are all illustrative, rather than limiting the scope of protection of the present disclosure.

At 602, a request for a backup job is transmitted from the source node 110 to the destination node 130, and a proxy virtual machine P1 deployed on a plurality of virtual machines on the source node 110 includes a backup application for performing data backup for a plurality of virtual machines. At 604, an indication of hardware configuration is received from the managing node 120, and the hardware configuration is allocated by the managing node 120 based on the workload of the backup job, with the workload being determined by the destination node 130 in response to the request. At 606, the backup job is performed by the backup application based on the hardware configuration. By implementing the above method for process 600 to determine the hardware configuration of the proxy virtual machine P1 for data backup, the hardware resources at the user side may be allocated precisely and reasonably. In this manner, the administrator needs not adjust the number of proxy virtual machines manually for each data backup, and all the operations of data backup may be completed by the backup system 100 including a source node 110, a managing node 120 and a destination node 130.

For the change trend of a particular data backup deviating from the history data, it is possible to obtain, by a proxy virtual machine P1, the actual data change rate of this particular data backup of the source node 110. Then, in response to the difference between the forecast data change rate and the actual data change rate being greater than a predetermined threshold, it is reported to the managing node 120 so as to be provided to the administrator for further processing. It is to be understood that even if such a situation occurs, the technical solution of data backup discussed in the present disclosure may also be executed.

Through the above depiction, it may be seen that in embodiments of the present disclosure, on the whole, data backup is not performed based on the predetermined data change rate, the backup rate of the proxy virtual machine and the number of proxy virtual machines. In embodiments of the present disclosure, firstly, the data change rate of the disk array of the source node 110 of this data backup and the backup rate of the proxy virtual machine P1 are predicted based on the history data, and the workload of this time of data backup is estimated reasonably based on these parameters. Moreover, no matter whether the workload is increased or decreased, only one proxy virtual machine P1 is configured for the disk array of the source node 110 and the hardware configuration of the proxy virtual machine P1 is adjusted. In addition, the allowed number of concurrent backups of the proxy virtual machine P1 may be determined based on history data so as to further improve data backup efficiency. Furthermore, as stated above, as an automatic suspending mechanism is configured for the proxy virtual machine P1, it is possible to save hardware resources for the user within a considerable period of time, thereby improving efficiency of data backup as a whole.

The realization of saving hardware resources may be verified through experimentation. For example, to process 24 concurrent backup jobs (about 40 GB), three proxy virtual machines may be configured in the traditional backup system. The three proxy virtual machines have default hardware configuration, namely, four CPUs and 4 GB memory. That is, 12 CPUs and 12 GB memory in total are necessary to complete the backup job. Besides, the allowed number of concurrent backups is eight.

Correspondingly, to process these 24 concurrent backup jobs, a proxy virtual machine may be deployed in accordance with embodiments of the present disclosure and it is allocated with eight CPUs and 6 GB memory, and the allowed number of concurrent backups is set as 24. Through operation it may be found that the traditional way of backup requires 24 minutes while embodiments of the present disclosure require 20 minutes. That is, the time required for backup is substantially the same for the two approaches while embodiments of the present disclosure save four CPUs and 6 GB memory.

Figure 7:
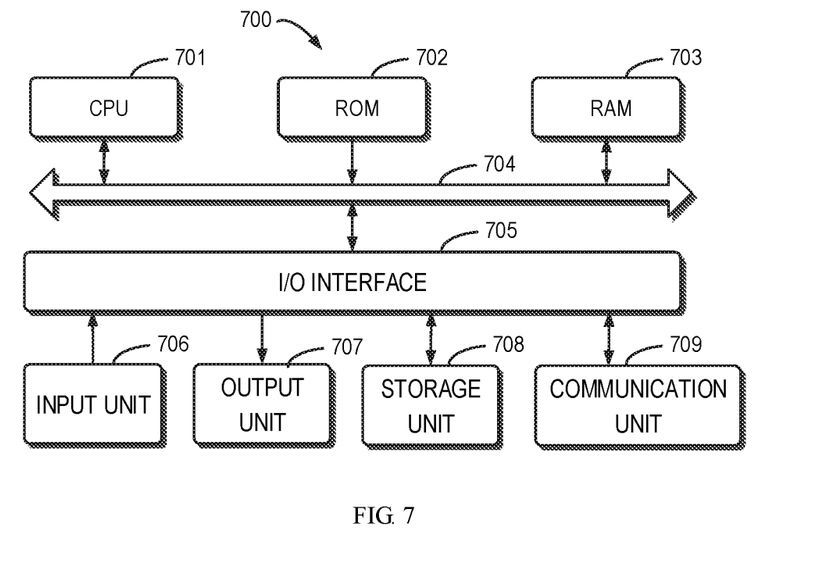
FIG. 7 illustrates a schematic block diagram of a device for data backup in accordance with embodiments of the present disclosure.

FIG. 7 illustrates a schematic block diagram of an example device 700 that may be used to implement embodiments of the present disclosure. As illustrated, the device 700 includes a central processing unit (CPU) 701 which may perform various appropriate actions and processing based on the computer program instructions stored in a read-only memory (ROM) 702 or the computer program instructions loaded from a storage unit 708 into a random access memory (RAM) 703. The RAM 703 also stores all kinds of programs and data required by operating the storage apparatus 700. CPU 701, ROM 702 and RAM 703 are connected to each other via a bus 704, to which an input/output (I/O) interface 705 is also connected.

A plurality of components in the device 700 are connected to the I/O interface 705, including: an input unit 706, such as keyboard, mouse and the like; an output unit 707, such as various types of displays, loudspeakers and the like; a storage unit 708, such as magnetic disk, optical disk and the like; and a communication unit 709, such as network card, modem, wireless communication transceiver and the like. The communication unit 709 allows the device 700 to exchange information/data with other devices through computer networks such as Internet and/or various telecommunication networks.

Each procedure and processing described above, such as method 300, 400, 500 and/or 600, may be executed by CPU 701. As an example, in some embodiments, the method 300, 400, 500 and/or 600 may be implemented as computer software programs, which are tangibly included in a machine-readable medium, such as storage unit 708. In some embodiments, the computer program may be partially or completely loaded and/or installed to the device 700 via ROM 702 and/or the communication unit 709. When the computer program is loaded to RAM 703 and executed by CPU 701, one or more acts of the above described method 300, 400, 500 and/or 600 are implemented.

The present disclosure may be a method, an apparatus, a system and/or a computer program product. The computer program product may include a computer-readable storage medium loaded with computer-readable program instructions thereon for executing various aspects of the present disclosure.

The computer-readable storage medium may be a tangible device capable of holding and storing instructions used by the instruction-executing device. The computer-readable storage medium may be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described herein may be downloaded from the computer-readable storage medium to various computing/processing devices, or to external computers or external storage devices via Internet, local area network, wide area network and/or wireless network. The network may include copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcodes, firmware instructions, state setting data, or a source code or destination code written by any combinations of one or more programming languages including object-oriented programming languages, such as Smalltalk, C++ and so on, and conventional procedural programming languages, such as "C" language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagram of the method, device (system) and computer program product according to the embodiments of the present disclosure. It is to be understood that each block in the flow chart and/or block diagram and any combinations of various blocks thereof may be implemented by the computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of data backup, comprising:
receiving, at a managing node and from a destination node, a workload of a backup job, wherein the workload is determined by the destination node in response to a request for the backup job from a source node;
determining, by the managing node and based on the workload, a hardware configuration to be allocated to a proxy virtual machine arranged in a plurality of virtual machines on the source node, the proxy virtual machine comprising a backup application for performing data backup for the plurality of virtual machines; and
transmitting, by the managing node, an indication of the hardware configuration to the proxy virtual machine of the source node to enable the backup application to perform the backup job using the hardware configuration.

2. The method according to claim 1, wherein the workload comprises a data change rate of the source node and a backup rate of the proxy virtual machine that are predicted based on history data stored at the destination node,
wherein the history data include a plurality of data change rates and a plurality of backup times corresponding to a plurality of backup jobs that have occurred.

3. The method according to claim 2, wherein the data change rate of the source node is predicted based on the plurality of data change rates, and the backup rate of the proxy virtual machine is predicted based on the plurality of data change rates and the plurality of backup times.

4. The method according to claim 2, further comprising:
configuring an allowed number of concurrent backups for the backup job; and
transmitting an indication of the allowed number of concurrent backups for the backup job to the proxy virtual machine of the source node to enable the backup application to perform the backup job based on the allowed number of concurrent backups for the backup job.

5. The method according to claim 4, wherein configuring the allowed number of concurrent backups for the backup job comprises:
obtaining, from the history data, a first backup time required by a unit workload of a previous backup;
obtaining, from the history data, a second backup time required by a unit workload of a backup prior to the previous backup; and
when the first backup time is shorter than the second backup time, increasing the allowed number of concurrent backups.

6. The method according to claim 2, further comprising:
obtaining an actual data change rate of the source node via the proxy virtual machine; and
when a difference between the data change rate and the actual data change rate of the source node is greater than a predetermined threshold, reporting to the managing node that the difference is greater than the predetermined threshold.

7. The method according to claim 1, further comprising:
when the workload is not received from the destination node associated with the request within a predetermined period of time, suspending the proxy virtual machine.

8. A method of data backup, comprising:
transmitting, by a source node, a request for a backup job to a destination node, wherein a proxy virtual machine in a plurality of virtual machines on the source node comprises a backup application for performing data backup for the plurality of virtual machines;
receiving an indication of a hardware configuration from a managing node, the hardware configuration being allocated to the proxy virtual machine by the managing node based on a workload of the backup job, the workload being determined by the destination node in response to the request; and
performing the backup job via the backup application using the hardware configuration.

9. The method according to claim 8, further comprising:
obtaining an actual data change rate of the source node via the proxy virtual machine; and
when a difference between a predicted data change rate associated with the hardware configuration and the actual data change rate of the source node is greater than a predetermined threshold, reporting to the managing node that the difference is greater than the predetermined threshold.

10. An electronic device, comprising:
at least one processing unit; and
at least one memory coupled to the at least one processing unit and storing machine executable instructions, the instructions, when executed by the at least one processing unit, causing the at least one processing unit to perform a method, the method comprising:
receiving, from a destination node, a workload of a backup job, wherein the workload is determined by the destination node in response to a request for the backup job from a source node;
determining, based on the workload, a hardware configuration to be allocated to a proxy virtual machine arranged in a plurality of virtual machines on the source node, the proxy virtual machine comprising a backup application for performing data backup for the plurality of virtual machines; and
transmitting an indication of the hardware configuration to the proxy virtual machine of the source node to enable the backup application to perform the backup job using the hardware configuration.

11. The device according to claim 10, wherein the workload comprises a data change rate of the source node and a backup rate of the proxy virtual machine predicted based on history data stored at the destination node,
wherein the history data comprises a plurality of data change rates and a plurality of backup times corresponding to a plurality of backup jobs that have occurred.

12. The device according to claim 11, wherein the data change rate of the source node is predicted based on the plurality of data change rates, and the backup rate of the proxy virtual machine is predicted based on the plurality of data change rates and the plurality of backup times.

13. The device according to claim 11, the method further comprising:
configuring an allowed number of concurrent backups for the backup job; and
transmitting an indication of the allowed number of concurrent backups for the backup job to the proxy virtual machine of the source node to enable the backup application to perform the backup job based on the allowed number of concurrent backups for the backup job.

14. The device according to claim 13, wherein configuring the allowed number of concurrent backups for the backup job comprises:
obtaining, from the history data, a first backup time required by a unit workload of a previous backup;
obtaining, from the history data, a second backup time required by a unit workload of a backup prior to the previous backup; and
when the first backup time is shorter than the second backup time, increasing the allowed number of concurrent backups by one.

15. The device according to claim 10, the method further comprising:
when the workload is not received from the destination node associated with the request within a predetermined period of time, suspending the proxy virtual machine.

16. The device according to claim 10, the method further comprising:
obtaining an actual data change rate of the source node via the proxy virtual machine; and
when a difference between the data change rate and the actual data change rate of the source node is greater than a predetermined threshold, reporting to a managing node that the difference is greater than the predetermined threshold.

17. An electronic device, comprising:
at least one processing unit; and
at least one memory coupled to the at least one processing unit and storing machine executable instructions, the instructions, when executed by the at least one processing unit, causing the at least one processing unit to perform a method, the method comprising:
transmitting, by a source node, a request for a backup job to a destination node, wherein a proxy virtual machine in a plurality of virtual machines on the source node comprises a backup application for performing data backup for the plurality of virtual machines;
receiving an indication of a hardware configuration from a managing node, the hardware configuration being allocated to the proxy virtual machine by the managing node based on a workload of the backup job, the workload being determined by the destination node in response to the request; and performing the backup job via the backup application using the hardware configuration.

18. The device according to claim 17, the method further comprising:

obtaining an actual data change rate of the source node via the proxy virtual machine; and when a difference between a predicted data change rate associated with the hardware configuration and the actual data change rate is greater than a predetermined threshold, reporting to the managing node that the difference is greater than the predetermined threshold.

* * * * *